United States Patent [19]

Laver

[11] 4,251,930

[45] Feb. 24, 1981

[54] ASTRONOMICAL/ASTROLOGICAL CHART

[76] Inventor: John G. Laver, 3380A 22nd St., San Francisco, Calif. 94110

[21] Appl. No.: 58,694

[22] Filed: Jul. 18, 1979

[51] Int. Cl.[3] .............................................. G09B 29/00
[52] U.S. Cl. .................................... 434/106; 434/284
[58] Field of Search .................... 35/44; 33/1 SC, 268

[56] References Cited

U.S. PATENT DOCUMENTS

| | | | |
|---|---|---|---|
| 1,880,476 | 10/1932 | Ploner | 35/44 |
| 2,314,353 | 3/1943 | Jasperson | 35/44 |
| 2,495,211 | 1/1950 | Curtis | 35/44 |
| 3,751,830 | 8/1973 | Brynjegard | 35/44 |

*Primary Examiner*—Harland S. Skogquist
*Attorney, Agent, or Firm*—Townsend and Townsend

[57] ABSTRACT

An astronomical chart and projection system for mapping celestial movement plots the longitudinal positions of planets, as measured along the ecliptic, against time in a rectilinear coordinate system with each of the planets being represented by a line on the chart, such a line being designated the "major line" of the planet. The major line corresponding to at least one of the planets is repeated at fixed longitudinal displacements from itself to generate harmonic reproductions, typically at 45 degree intervals. These harmonic reproductions allow a user to immediately extract aspect information between the planet whose major line is harmonically reproduced and other planets, whether or not harmonically reproduced. The longitude and time axes preferably have a common origin at respective longitude and time coordinates corresponding to the vernal equinox, thus permitting sidereal and tropical time information to be extracted from the chart by simple linear scaling of coordinates. The chart is rendered especially useful for astronomers by the provision of a two-dimensional reproduction of the stars located within a band about the ecliptic. The information is color coded in order that the different major lines and their harmonics be readily identifiable.

13 Claims, 6 Drawing Figures

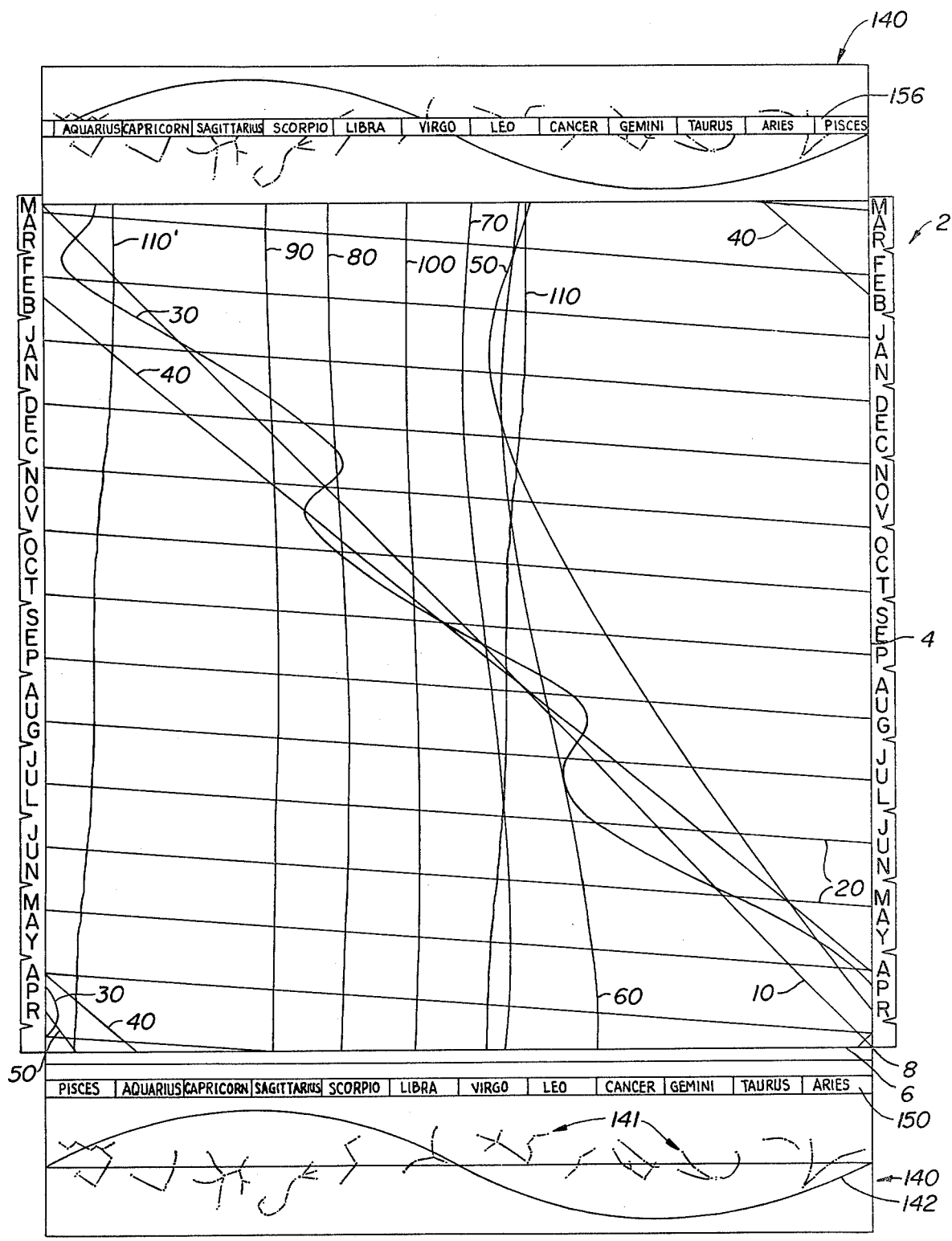
FIG._1.

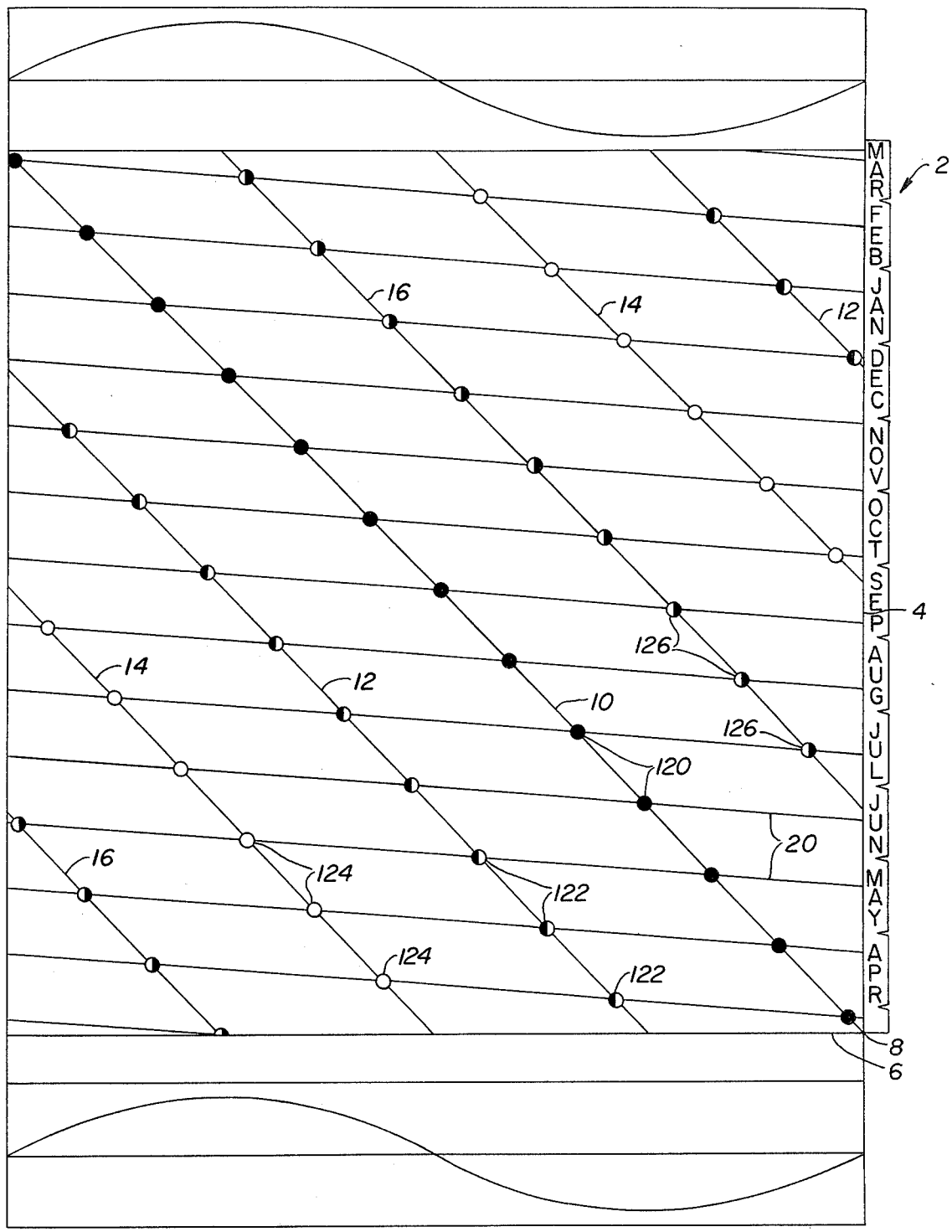
FIG._2.

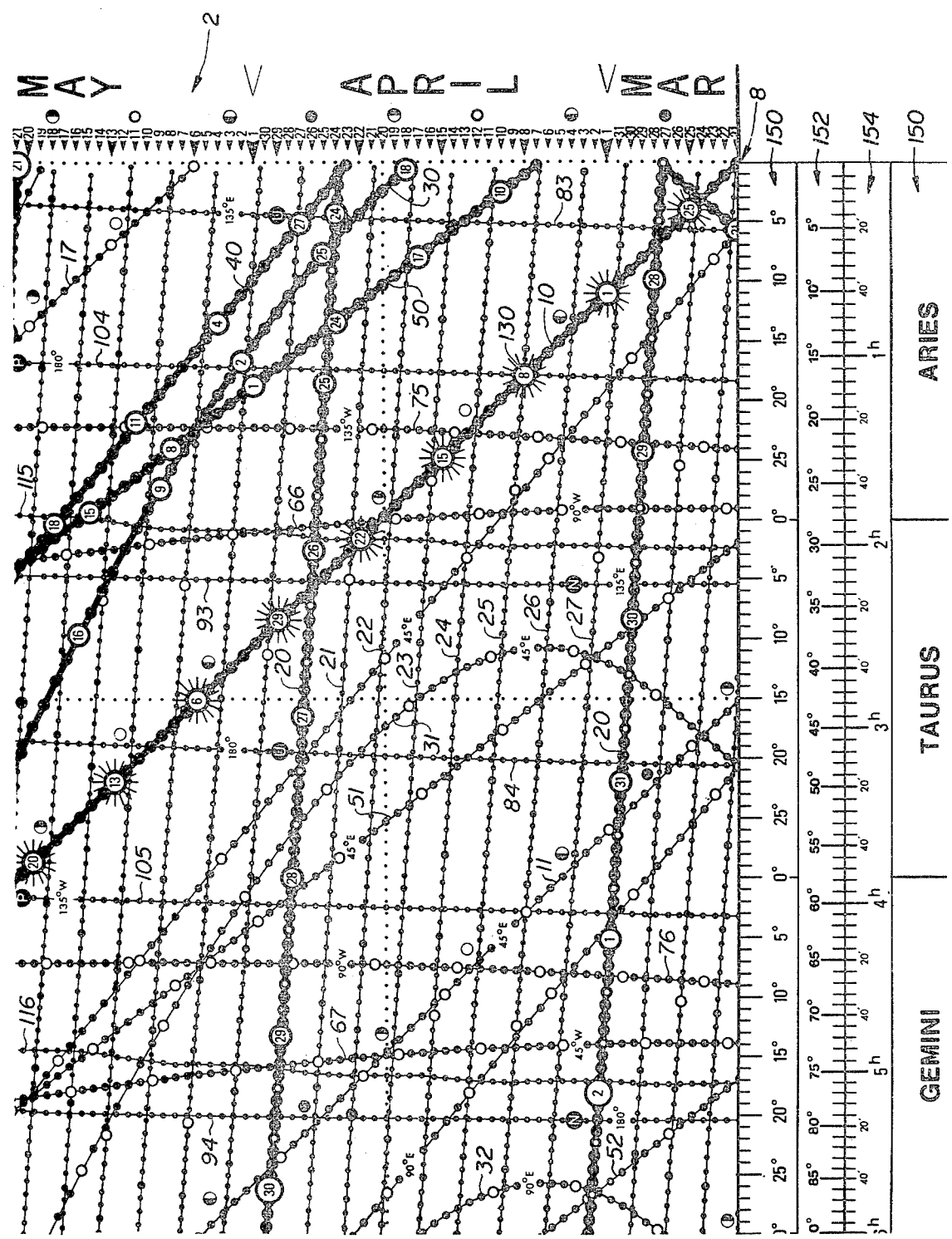

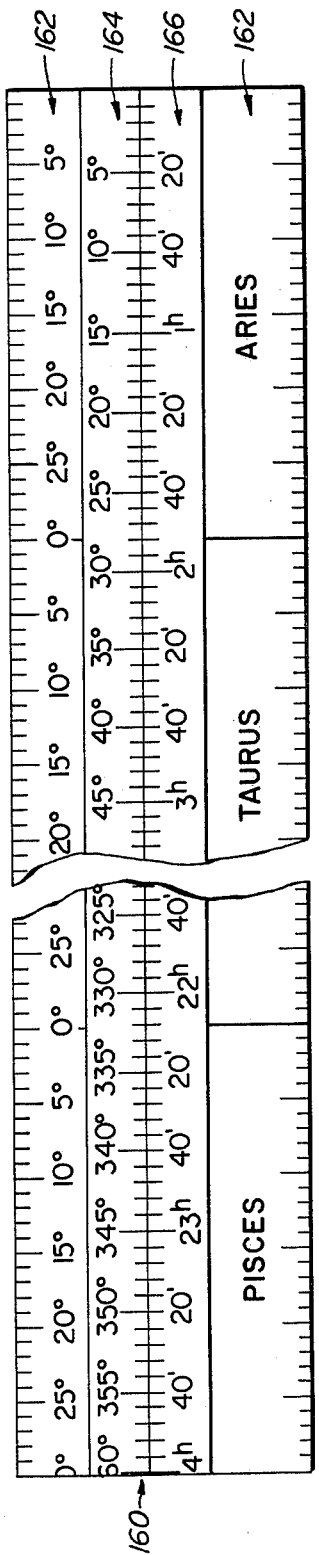
FIG._4.
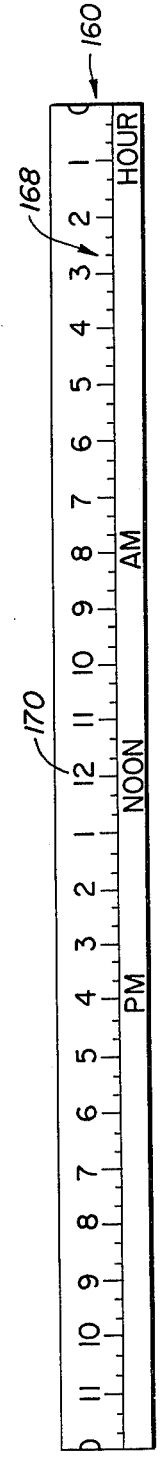
FIG._5.
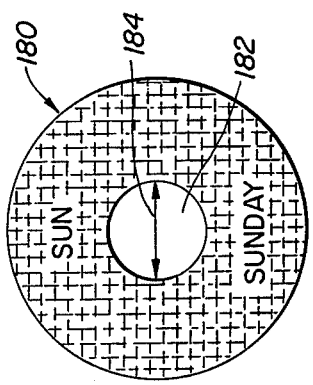
FIG._6.

ASTRONOMICAL/ASTROLOGICAL CHART

FIELD OF THE INVENTION

This invention relates generally to astronomical devices, and more specifically to a chart and mapping system for locating the longitudinal and time positions of astronomical objects.

BACKGROUND OF THE INVENTION

From the time they were first perceived as wanderers among the stars, the planets, the sun, and the moon, hereinafter sometimes referred to collectively as "the planets," have been the subject of speculation and inspiration. The very naming of the planets after the Gods—Jupiter, Mars, Neptune—provides a link with those by-gone days when mortals on earth looked in awe at the planets and saw in them everything that exemplifies the unknown and the unknowable. Even today, while people experiencing a solar eclipse do not fear that the world is ending, they cannot help but at least understand and perhaps feel some of the apprehension felt by their forefathers.

In spite of the aura of mystery that surrounded celestial movements and phenomena, the ancient civilizations did produce people who were able to develop the calendar, navigation, and time measurement based on objective observation. While superstition and fear tended to cast a pall on objective inquiry during the Middle Ages, a spark of objectivity and curiosity regarding the movement of the heavens continued to burn, and painstaking effort over periods of many years provided the empirical data from which Kepler was able to derive his famous laws and on which Newton was able to base his theory of gravitation. In more recent years, painstakingly precise astronomical measurements of planetary positions and distances have uncovered subtle phenomena such as the precession of the perihelion of Mercury which have been used to test Einstein's theory of general relativity.

Over the years, the students of celestial movement have applied the data of this motion in three major areas. Astronomers seek to relate astronomical phenomena to calendar language and to positions in space in order to explain phenomena such as phases of the moon and eclipses based thereon. Astrologers attempt to correlate planetary positions with behavioral events for the purposes of predictive study. Navigators use position information to orient their position on earth based on certain position coordinates of stars and planets. Over time, these disciplines have understandably become increasingly separated from each other as the purpose to which position data was applied became more specific to the needs of the particular discipline.

In addition, various timing notations have been developed to describe the location of a planetary or celestial body in the field of view of the observer. These notations are derived from timing based upon either the ecliptic or equatorial plane. The varying disciplines of astronomy, astrology, and navigation have tended to employ individualistic languages, making it difficult to develop tools providing common access to information.

Even within a given methodology the data presentation has often been awkward and difficult to use. For example, astrologers make use of numeric ephemeris information expressed in terms of Greenwich time. Such information is often awkward to use since an individual's location with respect to the International Data Line creates day changes which must be taken into account in any position determination. Additionally, such ephemeris information does not readily lend itself to making apparent the positions of the planets relative to one another. Yet, astrologers are interested in the timing and position of various angular relationships, called "aspects," and astronomers are interested in angular relationships, most specifically between the sun and the moon for the purpose of predicting eclipses and phases of the moon.

U.S. Pat. No. 1,880,476 to Ploner discloses apparatus for casting horoscopes, one element of which is a chart which has depicted, through traditional graphing methods, the numerical ephemeris by plotting the planetary positions as a function of time. The planetary positions are in terms of longitude along the ecliptic with a uniform ecliptic division corresponding to the twelve zodiacal signs, each having an angular extent of 30°. The chart does not provide any reference frame for astronomers, and does not allow the extraction of information of interest to astronomers, such as the times of upper meridian transit of different planets. Moreover, planetary aspects may only be obtained by means of a separate transparent overlay chart. Thus, while it is known to provide planetary positional data in a form of graphical representation to avoid the need for reliance on numerical tabulations, such graphical representation has tended to be limited and highly specialized, even for astrological use, and has provided little or no benefit to astronomers and navigators. Furthermore, it has not presented a whole system of movement of which information derived from an ephemeris is just a part.

SUMMARY OF THE INVENTION

The present invention provides an astronomical chart which gives instantaneous access to position information regarding the sun, moon, planets and fixed stars for use within the particular disciplines of astronomy, astrology, and navigation, which information may be easily applied across methodologies. This invention presents a new projection system for mapping celestial movement, and as such provides a common access frame to which all abstract systems of time and planetary movement may be related and provides easy reference to precise numeric data as well as to observable positions. Broadly, a chart according to present invention plots the longitudinal positions of planets, as measured along the ecliptic, against time in a rectilinear coordinate system with each of the planets being represented by a line on the chart, such a line being designated the "major line" of the planet. The major line corresponding to at least one of the planets is repeated at fixed longitudinal displacements from itself to generate harmonic reproductions, typically at 45 degree intervals. These harmonic reproductions allow a user to immediately extract aspect information between the planet whose major line is harmonically reproduced and other planets, whether or not harmonically reproduced. Thus, harmonic reproductions of the major sun line at 90° east, 180° (opposition), and 270° (90° west) displacements therefrom, provide information on phases of the moon corresponding to the intersection points with the major moon line. The chart also carries lines corresponding to the moon's nodes, so that solar and lunar eclipses may also be predicted based on the position of new moons and full moons with respect to the moon's nodes.

The longitude and time axes preferably have a common origin at respective longitude and time coordinates corresponding to the vernal equinox, thus permitting sidereal and tropical time information to be extracted from the chart by simple linear scaling of coordinates. The time axis is preferably defined with respect to local time on the West Coast of the United States, so that for longitudinal positions corresponding to 0000 hours on a given calendar date, all major populated areas throughout the world have a local time characterized by the same calendar date. Thus, complex time and date corrections are not needed.

According to a further aspect of the present invention, the chart is rendered especially useful for astronomers by the provision of a two-dimensional reproduction of the stars located within a band about the ecliptic. This pictorial representation extends along the longitude axis so that the position of a given planet may be observed in relation to the actual configuration of the stars. Information relating to the time of upper meridian transit of the various stars, sun, moon, and planets is quickly and easily obtained by use of the fixed scales and a separate movable scaling rule described hereinafter.

It will be appreciated that the presence of harmonic reproductions of the major lines increases by a substantial factor (i.e., a factor of 8 where 45 degree harmonics are provided) the amount of data on the chart. Thus, according to a further aspect of the present invention, the information is color coded in order that the different major lines and their harmonics be readily identifiable. According to this aspect of the present invention, each of the seven objects visible to the naked eye (sun, moon, and five planets) is assigned a distinct color and a distinct day of the week. Each line (except the moon line which will be discussed below) has marks thereon at one day intervals along the line with those marks corresponding to the assigned day being enlarged and provided with the assigned color. The moon, due to its proportionately greater longitudinal variations, has a much greater spacing between adjacent daily marks. Thus each of the daily marks is provided with color according to the day of the week, and the interval between daily marks is further subdivided into fractions of a day. The selective tagging of the different lines allows time information to be easily extracted from the chart without the user having to resort to the time axis itself or make use of a separate movable scale. Such a scale, as discussed above, does provide other advantages.

For a further understanding of the nature and advantages of the present invention, reference should be had to the remaining portion of the specifications and the attached drawings.

BRIEF DESCRIPTION OF THE DRAWINGS

FIG. 1 is a plan view showing the major lines on an astronomical chart according to the present invention;

FIG. 2 is a plan view showing the major Sun and Moon lines and harmonic reproductions of the major Sun line;

FIG. 3 is an enlarged plan view of a portion of the chart showing additional details;

FIG. 4 is a plan view of a relatively movable rule showing scalings correlating tropical ecliptic longitude to right ascension in degrees and sidereal hour providing access to precise data of upper meridian passage;

FIG. 5 is a plan view of the reverse side of the rule of FIG. 4 showing a scale for use in determining the approximate upper meridian transmitting times of various planets;

FIG. 6 is a plan view of a self-adhesive disc for use with the astronomical chart.

DETAILED DESCRIPTION OF THE INVENTION

FIG. 1 is a partially detailed view of an astronomical chart 2 according to the present invention, and presents the yearly movement of objects (sun, moon, planets, and moon's nodes, sometimes collective referred to as "planets") within the earth's solar system. While the various automated graphic techniques were tried out in order to generate astronomical chart 2, it was found that the best accuracy was obtained by hand plotting data extracted from numerical sources. Chart 2 is preferably a rectilinear plot wherein calendar time is measured along a first axis 4 and longitudinal displacement along a second axis 6 perpendicular to axis 4.

The time coordinate measured along axis 4 is preferably local time on the West Coast of the United States with marks at daily intervals corresponding to 0000 hours, local time for the West Coast of the United States. Thus, at 0000 hours for a given date, all major populated areas of the world have a calendar date that is the same as the date in question. Some relatively sparsely populated areas located west of the continental United States and east of the International Date Line will have calendar dates corresponding to the previous day.

Longitudinal displacement along axis 6 is preferably measured in degrees along the ecliptic. Axes 4 and 6 preferably intersect to define an origin 8 corresponding to the vernal equinox, that is the time of year when the line of intersection of the ecliptic and the earth's equatorial plane is coincident with the line between the sun and the earth and wherein the sun is apparently crossing the equator from south to north as viewed from the earth. Longitude as measured along axis 6 is preferably in terms of angular displacement eastward from the line between the sun and the earth at the vernal equinox. The direction of this line is begun at 0° Aries, scaled through 360° from this point, and correlated to additional time notations.

The longitudinal coordinate of each planet as a function of time is characterized by a primary line, designated the "major" line, and secondary lines which are harmonic reproductions thereof at fixed angular intervals. An angular interval of 45° is preferred, in which case there are seven harmonics for each major line. FIG. 1 shows the major lines only, the corresponding reference numerals and planets being as follows:

| Sun | 10 |
|---|---|
| Moon | 20 |
| Mercury | 30 |
| Venus | 40 |
| Mars | 50 |
| Jupiter | 60 |
| Saturn | 70 |
| Uranus | 80 |
| Neptune | 90 |
| Pluto | 100 |
| Moon's Node | 110, 110' |

FIGS. 2 and 3 also show some of the harmonics. While not all harmonics of all major lines are shown, a uniform numbering system is used wherein the seven harmonics corresponding to a given major line are sequentially numbered from 1 through 7 proceeding east from the major line and are assigned reference numerals immediately following the reference numeral of the major line. For example, the harmonics of major Sun line 10 are designated 11, 12, 13, 14, 15, 16, and 17 while the harmonics of major Neptune line 90 are designated 91, 92, 93, 94, 95, 96, and 97.

Referring to FIG. 1, some general features of the major lines may be seen. Major Sun line 10 extends diagonally across chart 2 from origin 8 at the vernal equinox. The deviation from a perfectly straight line can be noticed and portrays more accurately the true sinusoidal nature of the curvature of movement of all planetary lines. Furthermore, it is to be noticed that major lines and/or their harmonics that cross 360° during the year may comprise separate line segments depending upon their point of angular origin. Since the Moon undergoes many revolutions about the Earth during one revolution of the Earth about the Sun, and since the complete angular range is one revolution, major Moon line 20 comprises a plurality of line segments at a relatively small angle with respect to axis 6.

An important aspect of the present invention is the provision of the harmonic reproductions of the planetary lines. For purposes of illustration, the only harmonics shown on chart 2 as illustrated in FIG. 2 are for major Sun line 10, and only include harmonics 12, 14, and 16, corresponding to 90° east, 180° (opposition), and 270° (90° west) displacements, respectively, from major Sun line 10. Each of these comprises first and second line segments on opposite sides of major Sun line 10. This is always true of the harmonic reproductions of major Sun line 10 where the diagonally opposite corners of the chart are successive vernal equinoxes. For other planets whose major line does not extend the entire 360° range along axis 6, some of the harmonic reproductions may comprise a single continuous line segment. Similarly, some planets whose major line comprises two line segments may have at least some harmonic reproductions that are a single line segment. While FIG. 2 shows harmonic reproductions at 90° intervals, the preferred embodiment provides harmonic reproductions at smaller intervals, 45° being preferred.

The significance of the harmonic reproductions may be seen with the single example illustrated in FIG. 2, which shows the relationship between the harmonic reproductions of the major Sun line with respect to the major Moon line. Since major Sun line 10 and its harmonics have a different slope than the line segments of major Moon line 20, intersections occur. In particular the line segments that make up major Moon line 20 are intersected by major Sun line 10 at a set of intersection points 120, indicating the occurrences of new moons. Similarly, the line segments making up major Moon line 20 are intersected by harmonics 12, 14, and 16 at sets of points 122, 124, and 126, respectively, indicating the occurrences of first quarter, full, and third quarter Moons, respectively. Small symbolic representations of these phases are placed proximate the points of intersection to show the proper angular relationship of the moon phase to the sun.

As described above, each of the major lines has associated therewith seven harmonics. Therefore, a large volume of information is contained on chart 2, and certain features of the invention are directed toward minimizing possible confusion. FIG. 3 shows a representative portion of chart 2 in which all of the major lines, harmonics, and markings appropriate for the portion shown appear. For purposes of illustration, the portion illustrated in FIG. 3 includes origin 8, and extends two months along axis 4 and 90° along axis 6. Within this portion of chart 2, a portion of major Sun line 10, portions of two line segments of major Moon line 20, and portions of major Mercury line 30, major Venus line 40, and major Mars line 50 appear. Additionally, portions of various harmonics are shown, a differentiation being maintained by having the harmonics shown in lighter lines than those used to show the major lines. In particular, portions of sun harmonics 11 and 17 Moon harmonics 21-27, Mercury harmonics 31 and 32, Mars harmonics 51 and 52, Jupiter harmonics 66 and 67, Saturn harmonics 75 and 76, Uranus harmonics 83 and 84, Neptune harmonics 93 and 94, Pluto harmonics 104 and 105, and Moon's Node harmonics 115 and 116.

The extraction of information from chart 2 is greatly facilitated by marking each of the planetary lines and harmonics (except for the major Moon line and its harmonics as discussed hereinafter) with marks at daily intervals. Each of the seven objects visible to the naked eye (Sun, Moon, Mercury, Venus, Mars, Jupiter, and Saturn), is assigned a distinct color and distinct day of the week as follows:

| Sun | Sunday | Yellow |
| --- | --- | --- |
| Moon | Monday | Grey |
| Mars | Tuesday | Red |
| Mercury | Wednesday | Orange |
| Jupiter | Thursday | Purple |
| Venus | Friday | Green |
| Saturn | Saturday | Blue |

Every mark on a given major line or harmonic (except the Moon) that corresponds to the assigned day of the week is enlarged and provided with the assigned color. The harmonic marks are proportionately smaller than the marks on the major lines. For example, those marks 130 on major Sun line 10 and its harmonics corresponding to Sundays are enlarged and provided with the color yellow. Additionally, the enlarged colored marks on the major lines are preferably tagged with the calendar date in order to provide easy reference to the time frame. The calendar dates are typically not provided on the harmonic lines as the color code here is used to provide planetary identity and day of the week and there is easy access to the calendar dating on the major lines.

The Moon, due to its proportionately greater longitudinal variations, has a much greater spacing between additional daily marks. Each daily mark is enlarged and provided with the color corresponding to the particular day of the week, with the grey marks for Mondays being proportionately larger. The interval between daily marks is further subdivided into fractions of a day, as for example into 2-hour intervals. This division allows for the establishment of the adjustable time zone scaling by allowing the user to designate the appropriate subdivision marking in terms of his local time of that day.

A star chart 140 extends along longitudinal axis 6, and shows pictorially stars located within a band about the ecliptic (e.g., extending from 30° south to 30° north of the ecliptic). Traditional groupings of stars 141 (that is, constellations) are indicated by joined lines and star magnitudes are indicated by differences in the respective sizes of the stars portrayed. Superimposed on star chart 140 is a curve 142 representative of the angular elevation of the Earth's equatorial plane with respect to the ecliptic. The curve is approximately sinusoidal, passing through zero at the vernal equinox and the autumnal equinox, deviations from a pure sinusoidal curve reflecting the eccentricity of the earth's orbit.

Referring to FIG. 3, additional correlated fixed scales extending along longitudinal axis 6 may be seen. These scales are typically located between star chart 140 and chart 2 and provide direct conversion to numeric data of major time notation systems. A first scale 150 indicates tropical ecliptic degrees longitude from the vernal equinox and extends from 0° through 360°, being further divided into 12 equal divisions of 30° each and identifying the signs of the tropical zodiac-Aries, Gemini, etc. A second scale 152 correlates scale 150 to the equatorial plane by providing equatorial longitude in degrees right ascension. A third scale 154 correlates scales 1 and 2 to sidereal time measured from 0 to 24 hours in terms of the celestial equator. A fourth scale 156, on star chart 140, correlates scales 1–3 to sidereal zodiacal constellation degrees in 12 divisions of 0° to 30° through 360° with origin 8 corresponding to 5.9° Pisces. The alignment of the sun's position on the ecliptic longitude scale with the sidereal time scale determines the actual sidereal hour at noon (standard time) and also determines the upper meridian passage of any star in the celestial sphere and moon, and planets for any time within the year of the chart.

In order to further facilitate the extraction of numerical information from Chart 2 without confusingly increasing the amount of graphic information presented thereon, the background of Chart 2 preferably assumes the form of a screen of variable density. Thus, rather than having all the lines described above on a plain white background, or on a grid which would confusingly clutter the chart, the lines are superimposed on a background which comprises differing tone bands extending the entire distance along axis 4 and 30° each along axis 6. These 30° bands facilitate determining 30° interval aspects from the chart.

As will be described below, usage of chart 2 may be effectuated by means of a straightedge that may be laid parallel to either of axes 4 and 6. As an aid to achieving parallelism, markings from axes 4 and 6 are preferably duplicated on the opposite sides of chart 2. A further degree of ease and usefulness is provided by a relatively movable scaled rule 160, front and back surfaces of which are illustrated in FIGS. 4 and 5. Rule 160 has scales that duplicate at least some of fixed scales 150, 152, 154, and 156 that extend along axis 6. In particular, a tropical scale 162 on rule 160 corresponds to fixed scale 150, a scale 164 on rule 160 corresponds to scale 154, and a sidereal scale 166 on rule 160 corresponds to fixed scale 156. A scale 168 indicative of mean time is preferably located on the reverse surface of rule 160 with respect to the remaining scales. Scale 168 has hourly indicia with a central mark 170 corresponding to noon.

The present invention also provides a set of equal size discs representing the nine orbiting planets, the Sun, the Moon, and the Moon'Node. Those discs corresponding to the visible planets, the Sun and the Moon, are color coded as described above. FIG. 6 shows one such disc 180 for the Sun. Disc 180 is shown shaded for yellow and carries indicia corresponding to the Sun and the associated day of the week (Sunday). Disc 180 has a central aperture 182 having a diameter 184 that is commensurate with enlarged color coded marks 130 on major Sun line 10. Disc 180 has a self-adhesive back to allow it to be affixed to chart 2, scale 150 or star chart 140 in order to provide specific identification of coordinates of interest. Thus, one is able to indicate specific times and positions on the major lines in either the solar system map or the star chart.

Having described the detailed construction of the present invention, the operation may be seen. Extraction of numerical coordinates of a given planet for a given day is determined by first laying any straightedge parallel to the time axis 4 and passing through the mark on major line corresponding to the day in question, and then reading the numerical coordinate off the appropriate fixed scale. Additionally, the position of the planet in the sky with respect to the fixed stars is provided by extending the straightedge into star chart 140.

Rule 160 may be used merely as straightedge, but its scales may be used to further advantage. For example, longitude information may be read off rule 160 by placing rule 160 parallel to axis 6 and passing through the mark on the major line or harmonic corresponding to the day in question. Parallelism is effected by having rule 160 also pass through a mark on axis 4 corresponding to the same day. Then, if rule 160 is aligned so that its termination points correspond to the bounds of axis 6, angular information may be read off directly on the appropriate scale on rule 160. Alternately, if the angular separation between two different lines at the same time coordinate is desired, rule 160 may be moved longitudinally so that one of the lines crosses the rule at a convenient coordinate, thus allowing the separation to be read off directly.

Scale 168 on rule 160 allows transiting information to be easily extracted. Rule 160 is placed parallel to axis 6 with central mark 170 superimposed on the mark on major Sun line 10 for the day in question. The approximate standard time of upper meridian transit of a given planet is then read off by the intersection of that planet's major line with scale 168. The exact time of upper meridian transit is obtained by using scale 164.

Chart 2, especially in conjunction with rule 160, may be used to predict the occurrence of solar and lunar eclipses. Solar eclipses occur only on a new moon and when the moon's path crosses the ecliptic, while lunar eclipses occur only on full moon and when the moon's path crosses the ecliptic. Possible eclipses can thus be obtained by using the rule to find new Moons occurring within 17° 25' of the Moon's Node for solar eclipses and full Moons occurring within 11° 38' of the Moon's Node for lunar eclipses. This may be facilitated by the provision of suitable marks on scale 156 of rule 160.

In summary, it can be seen that the present invention provides a surprisingly useful astronomical chart and celestial mapping system which relates position and time constants to a common frame and employs various scaling systems to measure variables in relationship to these constants so that astronomers, astrologers, and navigators can utilize the invention to find, without calculation, information of interest to them. Thus, astronomers can ascertain local, sidereal, and solar time across time zones, numerical position coordinates expressed in degrees and hours, and positions in the tropical zodiac and sidereal constellations. They can thus determine exact apparent position of the Sun, Moon and planets in the fixed stars, exact time of meridian transits for all celestial bodies, and predict phases of the Moon and eclipses. Astrologers have the ability to cast natal and progressed horoscopes in terms of tropical and sidereal astrology, and can readily extract full yearly transiting information for natal and progressed horoscopes, and all mid-points. Navigators can find longitudinal positions of the planets, the Sun, and the Moon in the sky, the major stars along the ecliptic, the position of the celestial equator in terms of the fixed stars and the ecliptic, and the overall movement of the major luminaries in the sky to local times.

While the above provides a full and complete disclosure of the preferred embodiment of the invention, various modifications, alternate constructions, and equivalents may be employed without departing from the true spirit and scope of the invention. For example, the harmonics could be provided at 30° rather than 45° intervals, and other plots such as planetary nodes, asteroids, transpluto, etc., could be provided. It is to be appreciated that additional scalings of other timing notations such as sidereal hour angle could be added to the existing format as well as symbols in lieu of color to identify planets and days of the week. The chart may be presented in cylindrical form with the scale constructed as a sliding ring around the cylinder. Movable pieces representing the planets and noon position may be affixed to the rule. Therefore, the above description and illustration should not be construed as limiting the scope of the invention, which is defined by the appended claims.

What is claimed is:

1. In an astronomical chart and celestial mapping system for locating the longitudinal positions of astronomical objects and time as viewed from earth along the ecliptic and for deriving astronomical, astrological, and navigational information based thereon, such a chart having time measured along the first axis and longitudinal position measured along a second axis, with each of the objects being represented by a line that specifies its longitudinal position as a function of time, the improvement wherein the line corresponding to a first of said objects is repeated at a fixed longitudinal displacement from itself to generate a harmonic reproduction of said line, said longitudinal displacement being an integral submultiple of 360 degrees such that the intersection of said harmonic reproduction with the line corresponding to a second of said objects signifies a particular angular relationship between said first and second objects.

2. The invention of claim 1 in which a two-dimensional reproduction of the stars located in a band about the ecliptic is extended along said second axis defining longitudinal position so that the position of one of said objects may be observed in relation to the actual configuration of the stars.

3. The invention of claim 1 wherein said axes have respective termination points at a longitudinal position and time corresponding to the vernal equinox, thus permitting sidereal and tropical time information to be extracted from the same chart.

4. The invention of claim 1 wherein one of the objects is the earth's sun, and further comprising a separate relatively movable scale commensurate with said second axis and graduated in time with a 360 degree longitude interval corresponding to a 24-hour interval, said scale having marks indicative of hourly time thereon, one mark of which corresponds to noon, such that when said scale is placed on said chart parallel to said second axis at a position along said first axis corresponding to a particular day in question with said mark indicative of noon being superimposed on said line corresponding to the sun, the approximate time of day for the upper meridian transit of a given object is given by the intersection of the line corresponding to said given object with said scale.

5. The invention of claim 1 wherein calendar time measured along said first axis is with respect to local time on the west coast of the United States so that for longitudinal positions corresponding to 0000 hours on a given calendar date, all major populated areas throughout the world have a local time characterized by the same calendar date.

6. The invention of claim 1 wherein said objects include the group of seven objects comprising the sun, the moon, and the five planets visible with the naked eye, wherein each of the group of seven objects is uniquely associated with a particular day of the week and a particular color, wherein the line for a given object of said group of seven objects has superimposed thereon indicia carrying the given object's corresponding color at time coordinates corresponding to the given object's corresponding day.

7. The invention of claim 1 wherein said objects include the sun and the moon, and wherein harmonic reproductions are provided at 90 degree intervals for the line corresponding to the sun such that intersections of the line corresponding to the moon with said line corresponding to the sun and 90 degrees harmonic reproductions thereof define the phases of the moon.

8. The invention of claim 7, also having thereon a line corresponding to the longitudinal position of the moon's node as a function of time to permit the prediction of the occurrence of solar and lunar eclipses by ascertaining whether the points on the chart defining new moon and full moon fall within predetermined longitudinal distances of the moon's node at the time corresponding to the new moon and full moon.

9. The invention of claim 1 also comprising a relatively movable rule commensurate with said second axis and having indicia of longitude corresponding to said second axis.

10. The invention of claim 3 wherein one of the objects is the earth's sun and wherein said second axis has indicia measuring longitude in terms of tropical longitude, equatorial longitude, and sidereal time along the ecliptic, such that the alignment of the sun's position on the ecliptic longitude scale with the sidereal time scale determines the actual sidereal hour at noon, standard time, and also provides the upper meridian passage of a given object in hours and degrees right ascension.

11. An astronomical chart presenting a celestial mapping system for locating the longitudinal and time positions of astronomical objects including the sun, the moon, and at least one planet within the earth's solar system as viewed from earth along the ecliptic and for deriving astronomical, astrological, and navigational information based thereon by allowing the user to associate standard time notation and calendar notation with astronomical phenomena and then relate this astronomical phenomena directly to local hour language, said chart having time measured along a first axis and longitudinal position measured along a second axis, each of said axes having a respective termination point at a longitudinal position and time corresponding to the vernal equinox, a two-dimensional reproduction of the stars located in a band about the ecliptic being extended along said second axis, with each of the objects being represented by a primary line that specifies its longitudinal position as a function of time, and at least one secondary line displaced from said primary line by a fixed longitudinal displacement to generate a harmonic reproduction of said primary line, said longitudinal displacement being an integral submultiple of 360 degrees such that the intersection of the secondary line of a first of said objects with the primary line of a second of said objects signifies a particular angular relationship between said first and second objects.

12. In an astronomical chart and celestial mapping system for locating the longitudinal positions of astronomical objects and time as viewed from the earth along the ecliptic and for deriving astronomical, astrological, and navigational information based thereon, such a chart having time measured along a first axis and longitudinal position measured along a second axis, with each of the objects being represented by a line that specifies its longitudinal position as a function of time, the improvement wherein:

said axes have respective termination points at a longitudinal position and time corresponding to the vernal equinox, thus permitting sidereal and tropical time information to be extracted from the same chart;

said second axis has indicia measuring longitude in terms of tropical longitude, equatorial longitude, and sidereal time;

calendar time measured along said first axis is with respect to local time on the west coast of the United States so that for longitudinal positions corresponding to 0000 hours on a given calendar date, all major populated areas throughout the world have a local time characterized by the same calendar date;

said objects include the group of seven objects comprising the sun, the moon, and the five planets visible with the naked eye, wherein each of the group of seven objects is uniquely associated with a particular day of the week and a particular color, wherein the line for a given object of said group of seven objects has superimposed thereon indicia carrying the given object's corresponding color at time coordinates corresponding to the given object's corresponding day; and a two-dimensional reproduction of the stars located in a band about the ecliptic is extended along said second axis defining longitudinal position so that the position of one of said objects may be observed in relation to the actual configuration of the stars.

13. A method of determining the approximate time of day for the upper meridian transit of a celestial object comprising the steps of:

providing a chart having time measured along a first axis and longitudinal position along the ecliptic measured along a second axis, with the longitudinal positions of the sun and the celestial object being represented by respective lines specifying longitudinal position as a function of time;

providing a separate relatively movable scale commensurate with the second axis and graduated in time with a 360° longitude interval corresponding to a 24-hour interval, said scale having marks indicative of hourly time thereon, one mark of which corresponds to noon;

placing said scale on said chart parallel to said second axis with the mark corresponding to noon superimposed on the line representative of the sun's longitudinal position for the day in question; and reading the point of intersection between the line representative of the celestial object's longitude with the relatively movable scale.

* * * * *